L. J. BERRY.
COTTON HARVESTER.
APPLICATION FILED AUG. 12, 1914.
1,273,814.
Patented July 30, 1918.
3 SHEETS—SHEET 1.
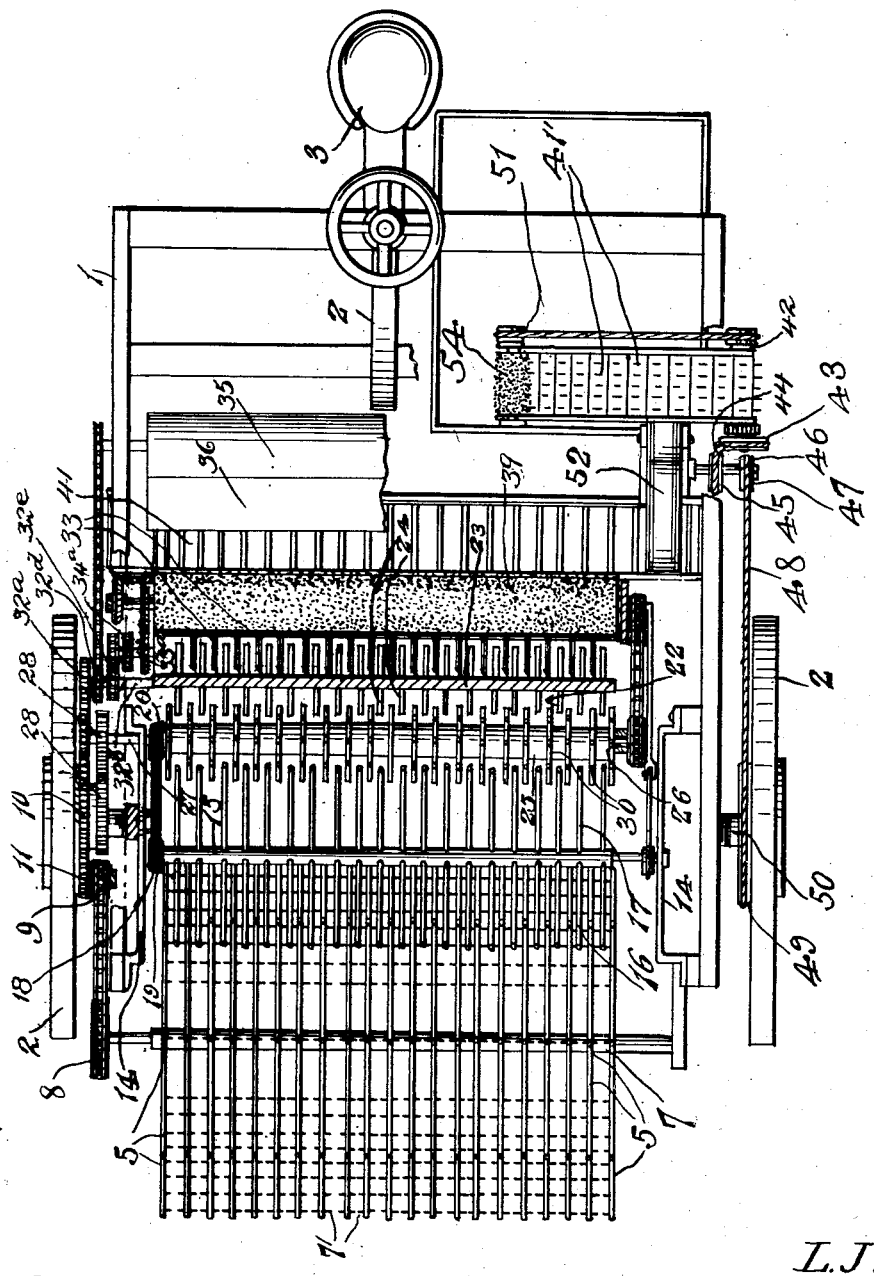
Witnesses
Inventor.
L. J. Berry.
By
Attorney

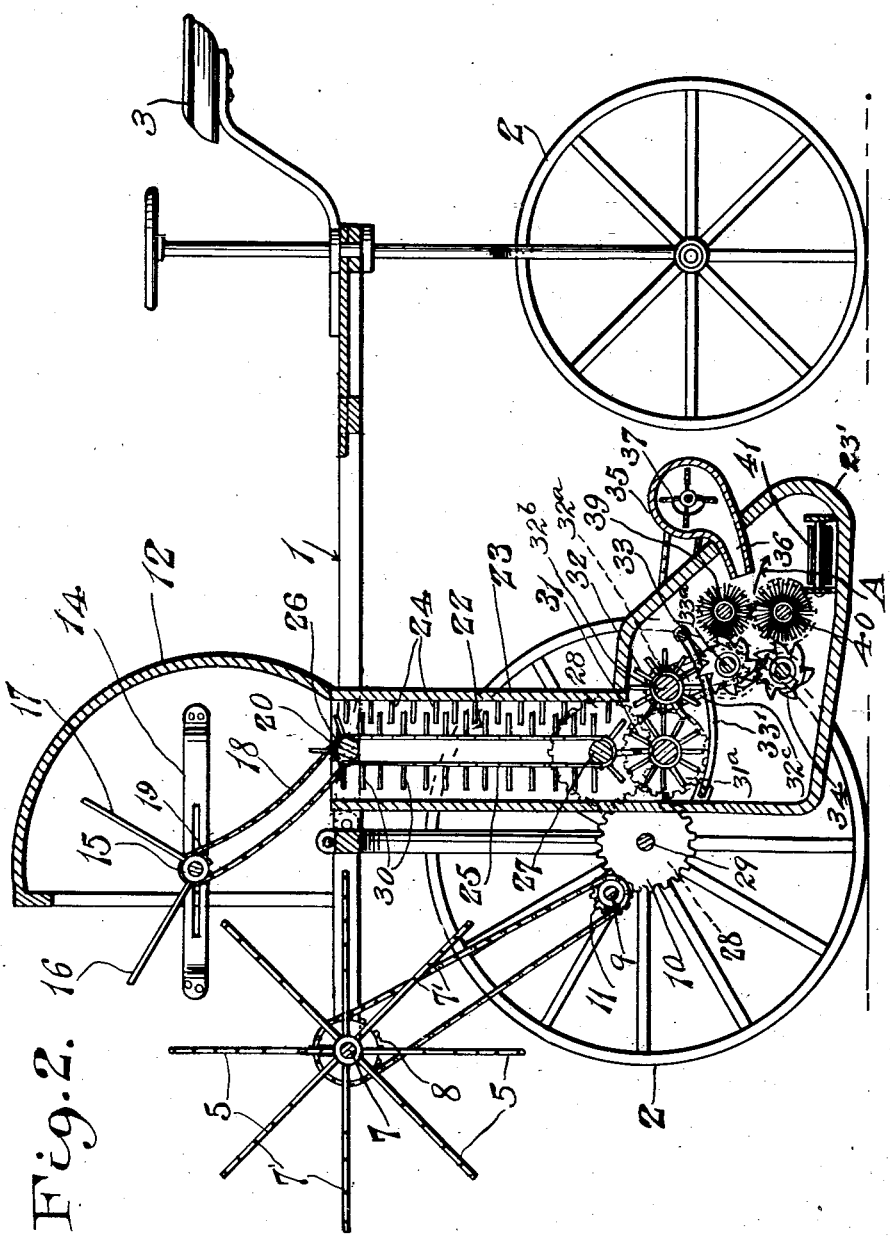

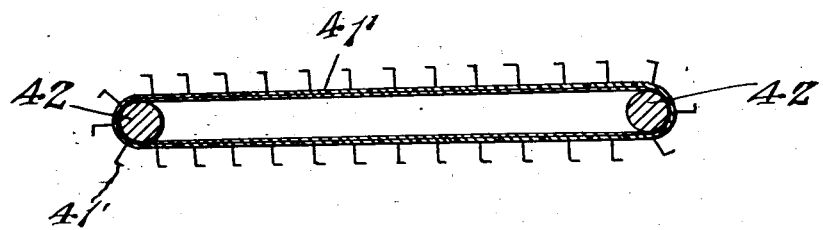
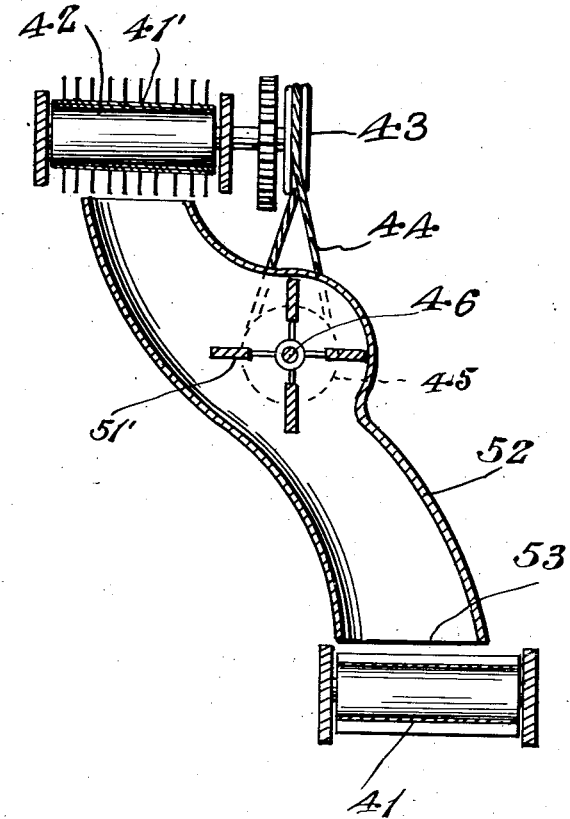

UNITED STATES PATENT OFFICE.

LOUIS J. BERRY, OF FORNEY, TEXAS.

COTTON-HARVESTER.

1,273,814.  Specification of Letters Patent.  Patented July 30, 1918.

Application filed August 12, 1914. Serial No. 856,419.

*To all whom it may concern:*

Be it known that I, LOUIS J. BERRY, a citizen of the United States, residing at Forney, in the county of Kaufman and State of Texas, have invented certain new and useful Improvements in Cotton-Harvesters; and I do hereby declare the following to be a full, clear, and exact description of the invention, such as will enable others skilled in the art to which it appertains to make and use the same.

This invention relates to a cotton harvesting machine and the primary object of the invention is the provision of a device for gathering the cotton from the plant, stripping the bolls or pods and cleaning the cotton in one continuous operation during the traction of the harvester over a cotton field.

Another object of this invention is the provision of a cotton harvester having a rotary picking member disposed forwardly thereon, and grabbing arms disposed rearwardly of the rotary picking arms for receiving the cotton gathered by the said picking arms and depositing it between two vertically operable crushers for crushing the bolls or pods preparatory to their passage into the ginning apparatus.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a top plan view of the improved cotton harvester showing parts in section.

Fig. 2 is a longitudinal sectional view through the cotton harvester,

Fig. 3 is a detail view of a part of the mechanism for drawing the ginned cotton apparatus and depositing the cotton into any suitable type of receptacle.

Fig. 4 is a side elevation of a conveyer which is shown in Fig. 3.

Referring more particularly to the drawings, 1 designates the supporting frame of the cotton harvester which has traction wheels 2 of the ordinary construction carried thereon. The frame 1 has mounted thereon a rotary picker or gatherer 5, which picker or gatherer is composed of a plurality of radially-extending rods or arms disposed longitudinally of the picker, which rods or arms have transversely extending picking teeth 7 formed thereupon. The rotary picking or gathering member 5 is mounted upon a shaft 7, which shaft has a sprocket 8 mounted upon one end thereof, and the sprocket 8 has a chain connection with a second sprocket 11, which second sprocket is rotated by the traction of the cotton picker through the medium of intermeshing gears 10 and 11.

The supporting frame 1 has a hood or cowl 12 secured thereto, which hood or cowl has mounted therein guide members 14, which guide members support a rock shaft 15. The rock shaft 15 carries a plurality of radially extending arms 16 and 17. The arms are positioned substantially at right angles to each other. The shaft 15 is rotated through a chain connection provided by the sprocket chain 18, and the sprockets 19 and 20 so that the cotton which is gathered by the rotary gathering member 5 will be stripped from the radially extending arms thereof, by the arms 16 and 17 and upon movement of the arms 16 and 17 will be dumped therefrom into the cowl or hood 12 and into the crushing mechanism 22.

The crushing mechanism 22 constitutes a vertically disposed plate 23 which is attached in any suitable manner to the lower edge of the cowl 12, and which plate has transversely extending teeth 24 secured to one side thereof and projecting laterally therefrom as is clearly shown in Fig. 2 of the drawings. The plate 23 has a conveyer 25 positioned parallel therewith, which conveyer travels about rollers 26 and 27. The rollers 27 are operatively connected for rotation with the drive-axle 29 of the cotton harvester by suitable gears 28.

The conveyer 25 has projecting transversely from its outer side, teeth 30, which teeth are spaced for passage between the teeth 24 which are mounted upon the plate 23, and when the cotton pods or bolls and the cotton contained therein are deposited within the cowl 12 by the arms 16 and 17, they pass downwardly between downwardly traveling run of the conveyer 25 and the plate 23, and the pods are crushed by the transversely extending teeth 24 and 30, so as to permit of the separation of the pods or bolls and the raw cotton.

Rotary brushes 31 and 32 are rotatably mounted beneath the vertically disposed crushing member 22 and they receive the cotton from the crusher and separate the pods from the raw cotton, and carry the cotton forwardly and deposit it upon the breast ribs 33′ between which the cotton is drawn by the ginning saws 33 and 34, where the raw cotton is ginned for the separation of the seed from the cotton. These brushes 31 and 32 are driven through gears 31$^a$ and 32$^a$ from gear 28 upon shaft 29; from the shaft 32$^b$ of the brush 32 a sprocket chain 32$^c$ extends to shaft 33$^a$ for driving the ginning saws. A sprocket chain for driving the fans 37 also extends from the shaft 32$^b$. The brushes 39 and 40 are driven from the shaft 33$^a$ by appropriate gearing.

A plurality of ribs 33′ are supported within the casing 23′ and positioned beneath the rotary brushes 31 and 32, so that the cotton will fall upon the ribs from the rotary brushes and be drawn therebetween by the saw cylinders 33 and 34 during the rotation of the latter.

A casing 35 is carried by the casing 23′ and is provided with an outlet spout 36 positioned in alinement with the meeting points of the peripheral teeth of the saw cylinders 33 and 34. The casing 35 has a rotary fan 37 mounted therein, which fan is rotated by the traction of the harvesting machine through any suitable type of power-transmitting mechanism. The rotation of the fan 37 creates a blast of air within the casing 35, and it passes outwardly through the outlet spout 36, forcing the blast between the saws and blowing the small particles of pods, dust or other foreign substance from the cotton preparatory to the passage of the cotton between the brushes 39 and 40 which brushes doff the saw cylinder 33 and 34. The brushes 39 and 40 may be driven in any suitable manner and preferably by sprocket and chain connection with the shaft carrying the ginning saws 33.

After the cotton leaves the rotary brushes 39 and 40, it is deposited upon a conveyer 41.

The roller 42 over which the conveyer 41 travels has a pulley 43 mounted upon one terminal end thereof, which pulley has a belt 44 passing thereabout. The belt 44 also passes about a pulley 45, which pulley is carried by a shaft 46. The shaft 46 has a second pulley 47 mounted thereupon which pulley has belted connection through the belt 48 with a pulley 49, which is mounted upon the power axle 50 of the harvesting machine, so that upon the traction of the harvester the shaft 46 will be rotated through the medium of the belt and pulley heretofore mentioned, and power will be administered to the roller 42 for driving the conveyer 41. Any suitable type of power transmitting mechanism may be employed for driving the roller 51, about which the opposite end of the conveyer 41 passes.

The shaft 46 has a fan 51′ mounted thereupon, which fan is positioned within a casing 52. The casing 52 has its ingress opening 53 positioned adjacent the conveyer 41, so that the cotton will be drawn into the casing 52 to the ingress opening 53 by suction generated by the rotation of the fan 51′. The egress of the casing 52 is positioned above the conveyer 41′, and the cotton passing through the casing from the traveler 41 will be deposited upon the conveyer 41′, and carried for depositing in any suitable type of receptacle. Brushes 54 are rotatably mounted above the conveyer 41′ for gathering the stray particles of cotton from the conveyer during the operation of the latter.

In operation of the improved cotton harvester; the rotation of the cotton picking or gathering member 5 will gather the cotton pods from the plants, and the transversely extending fingers 7′ which are mounted thereupon, will carry the cotton upwardly until it is removed therefrom by one of the arms 16 and 17. Further operation of the harvester will rotate the shaft which carries the arms 16 and 17 causing them to deposit the cotton into the cowl or hood 12, from which it is received by the vertically operating crushing mechanism 22. The cotton and the crushed pods are brushed from the conveyer 22 by the rotary brushes 31 and 32, which deposit the cotton and pods upon the arcuate rods or gin breast 33′. The saw cylinder 33, which projects between the spaced rods 33′ will engage the cotton and pull the same through the rods, carrying it about between the saw cylinders 33 and 34, for ginning the cotton. The brushes 39 and 40, brush the cotton from the saws 33 and 34, and deposit it upon the conveyer 41. Prior to the deposit of the cotton upon the conveyer 41 the cotton is subjected to an air blast from the fan 37 which blows the small particles of pods, leaves or the like from the cotton. The conveyer 41 carries the cotton transversely of the frame of the cotton harvester, to the casing 52, into which it is drawn by the suction created by the fan 51. After passing through the casing 52, the cotton is deposited upon the conveyer 41′, and which carries it across the rear end of the cotton harvester and deposits it in a suitable type of receptacle, which may be supported by the supporting frame of the cotton harvester. During the travel of the cotton off of the conveyer 41′, it is brushed by the rotary brush 54.

From the foregoing description taken in connection with the accompanying drawings the advantages of the construction and of the method of operation of the improved cotton harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cotton harvester structure, the combination, of a supporting structure, a vertical downwardly extending plate, a plurality of transversely disposed vertically spaced fingers projecting outwardly from the forward face of said plate, a conveyer for travel downwardly in front of said plate, a plurality of transversely disposed fingers carried by said conveyer for passage between the transversely disposed fingers carried by said plate for efficiently crushing cotton and pods upon passage between said conveyer and said plate, and means for operating said conveyer by the travel of said harvesting machine.

2. In a cotton harvester structure, the combination, of a supporting structure, a vertical downwardly extending plate, a plurality of transversely disposed vertically spaced fingers projecting outwardly from the forward face of said plate, a conveyer for travel downwardly in front of said plate, a plurality of transversely disposed fingers carried by said conveyer for passage between the transversely disposed fingers carried by said plate for efficiently crushing cotton and pods upon passage between said conveyer and said plate, means for operating said conveyer by the travel of said harvesting machine, and a pair of rotary brushes positioned beneath the lower end of said conveyer and said plate for brushing the cotton from said conveyer.

3. In a cotton harvester structure, a portable supporting structure, a cotton and boll receiving cowl carried by said supporting structure, a vertical downwardly extending plate positioned beneath said cowl, a plurality of horizontal fingers carried by said plate, a vertical conveyer running parallel to said plate, a plurality of horizontal fingers carried by said conveyer and disposed staggerly to the fingers carried by said plate, means for operating said conveyer to move the run of the conveyer facing said plate downwardly for conveying and crushing cotton bolls, and means positioned beneath said conveyer for separating the crushed bolls from the cotton lint.

In testimony whereof I affix my signature in presence of two witnesses.

LOUIS J. BERRY.

Witnesses:
JOHNIE T. BREWSTER,
MATTHEW W. HICKS.